United States Patent [19]
Bredahl et al.

[11] Patent Number: 6,166,110
[45] Date of Patent: *Dec. 26, 2000

[54] PROCESS FOR PREPARING PRESSURE SENSITIVE ADHESIVES

[75] Inventors: Timothy D. Bredahl, Cottage Grove; Herbert W. Goetsch, Maplewood; Daniel C. Munson, St. Paul, all of Minn.; John Michael Oberthier, Ontario, Canada

[73] Assignee: 3M Innovatives Properties Company, St. Paul, Minn.

[*] Notice: This patent issued on a continued prosecution application filed under 37 CFR 1.53(d), and is subject to the twenty year patent term provisions of 35 U.S.C. 154(a)(2).

[21] Appl. No.: 09/198,781

[22] Filed: Nov. 24, 1998

[51] Int. Cl.[7] ........................................... C08J 3/20
[52] U.S. Cl. .................. 523/348; 156/289; 156/334; 156/338; 156/244.11; 427/208.4; 427/209; 427/505; 427/516; 523/318; 523/324; 524/270; 524/271; 524/274
[58] Field of Search ............................ 156/289, 327, 156/338, 244.11; 427/208.4, 209, 505, 516; 523/318, 324, 348; 524/270, 274, 271, 499; 526/313

[56] References Cited

U.S. PATENT DOCUMENTS

| | | | |
|---|---|---|---|
| 2,199,099 | 4/1940 | Cunningham | 524/525.5 |
| 2,879,547 | 3/1959 | Morris | 264/173.1 |
| 3,932,327 | 1/1976 | Korpman | 524/271 |
| 4,028,292 | 6/1977 | Korpman | 524/505 |
| 4,136,071 | 1/1979 | Korpman | 524/274 |
| 4,497,926 | 2/1985 | Toy | 524/271 |
| 5,158,725 | 10/1992 | Handa et al. | 264/40.7 |
| 5,539,033 | 7/1996 | Bredahl et al. | 524/270 |

FOREIGN PATENT DOCUMENTS

| | | |
|---|---|---|
| 698518 | 11/1964 | Canada . |
| 0 611 078 A1 | 8/1994 | European Pat. Off. . |
| 0 717 091 A2 | 6/1996 | European Pat. Off. . |
| 0 854 178 A1 | 7/1998 | European Pat. Off. . |
| 1 954 214 | 5/1971 | Germany . |
| 197 16 996 C1 | 4/1998 | Germany . |
| 50-37692 | 12/1975 | Japan . |
| 7-278509 | 10/1995 | Japan . |
| WO 97/09162 | 3/1997 | WIPO . |
| WO 97/23577 | 7/1997 | WIPO . |
| WO 97/47681 | 12/1997 | WIPO . |

OTHER PUBLICATIONS

*Handbook of Pressure Sensitive Adhesive Technology*, D. Satas (ed.), p. 268, Van Nostrand, N.Y., (1989).
*Handbook of Pressure Sensitive Adhesive Technology*, pp. 317–373, D. Satas (ed.), Van Nostrand, N.Y., (1989).
*Dictionary of Rubber*, K. F. Heinisch, pp. 359–361, John Wiley & Sons, N.Y., (1974).
*Handbook of Pressure Sensitive Adhesive Technology*, p. 172, D. Satas (ed.), Van Nostrand, N.Y., (1989).
*Handbook of Pressure Sensitive Adhesive Technology*, pp. 176–177 ($2^{nd}$ ed. D. Satas) (1989).

*Primary Examiner*—Peter A. Szekely

[57] ABSTRACT

A method for producing a pressure sensitive adhesive composition includes at least one elastomer that produces a substantially homogeneous pressure sensitive adhesive composition. The method is particularly well suited for relatively high throughput continuous compounding rates, e.g., at a throughput rate of more than about 5.4 kg/hr/l free volume of the continuous compounding device utilized in the

18 Claims, 3 Drawing Sheets

PROCESS FOR PREPARING PRESSURE SENSITIVE ADHESIVES

FIELD OF THE INVENTION

This invention relates to a solvent free, hot melt process for the manufacture of a non-thermoplastic, pressure sensitive adhesive (PSA) from a tackified elastomer that is particularly well suited for high throughput processes.

BACKGROUND OF THE INVENTION

Pressure sensitive adhesives based on non-thermoplastic hydrocarbon elastomers such as natural rubber, butyl rubber, synthetic polyisoprene, ethylene-propylene, polybutadiene, polyisobutylene, or styrene-butadiene random copolymer rubber, are known in the art. Typical processing of such adhesives includes masticating the elastomer on a two roll mill or in a Banbury type internal mixer, dissolving the elastomer and other adhesive components in a hydrocarbon solvent, coating the solution onto a backing, and drying the coated product to remove the solvent. This technology is discussed in *Handbook of Pressure Sensitive Adhesive Technology*, D. Satas (ed.), p. 268. Van Nostrand, N.Y., (1989). This solvent process has the disadvantages of being labor intensive and having low production rates. Moreover, such solvent based processes have become increasingly undesirable for use in making adhesive tapes because of increasing environmental regulations throughout the world.

Another processing method, sometimes used when a relatively thick adhesive layer is desired, includes masticating the elastomer as described above, blending the rubber and other adhesive components in an internal mixer such as a Banbury mixer, and calendering the solid adhesive onto a backing using a three or four roll calender stack. The calendering process does not use solvent but does require very expensive equipment. Additionally, this process is snow, and is only economical when adhesive coatings greater than about 2 mils (51 mm) thick are desired. An application of the calendering process is discussed in U.S. Pat. No. 2,879,547 to Morris.

Environmental considerations, lower initial capital investments, potentially higher production rates, and lower processing costs have led to accelerated interest in the use of continuous hot melt compounding and extrusion coating of thermoplastic adhesive compositions. Typical elastomers employed in this technique are "thermoplastic" elastomers of the block copolymer type, including for example, styrenic-diene block copolymers. Such materials exhibit a sharp reduction in viscosity at temperatures above 100° C. where the styrene domains soften. Upon cooling, the domains reform and the material regains its rubbery character and cohesive strength. Illustrative teachings of adhesive formulations and processes of this type are found, for example, in U.S. Pat. No. 3,932,328 to Korpman, U.S. Pat. No. 4,028,292 to Korpman, and U.S. Pat. No. 4,136,071 to Korpman. The technology is further discussed in *Handbook of Pressure Sensitive Adhesive Technology*, pp. 317–373, D. Satas (ed.), Van Nostrand, N.Y., (1989).

Hot melt pressure sensitive adhesives based on these thermoplastic elastomers have found wide acceptance in the packaging, label, diaper closures, and masking tape markets. The adhesive properties of pressure sensitive adhesives made from thermoplastic elastomers, such as those mentioned above, differ from those of adhesives based on non-thermoplastic hydrocarbon elastomers, and are undesirable for many tape applications.

Hot melt extrusion of pressure sensitive adhesives employing non-thermoplastic hydrocarbon elastomers such as natural rubber has been shown. However, low molecular weight plasticizing aids such as processing oils, elastomer oligomers, waxes, or other materials defined and described as plasticizers in *Dictionary of Rubber*, K. F. Heinisch, pp. 359–361, John Wiley & Sons, N.Y., (1974), are used as major components in the adhesive formulations. These plasticizing aids ease processing but detract from the ability of the finished adhesive to sustain a load and are generally known to degrade adhesive performance.

Canadian Patent No. 698,518 to P. Beiersdorf & Co., discloses a solventless extrusion coating process for coating a PSA composition based on non-thermoplastic elastomers including natural and synthetic rubber, high molecular weight polyisobutylene and polyvinyl ether. The elastomer is pre-masticated and blended in a separate, batchwise operation using conventional rubber processing equipment such as a two-roll mill or a Banbury mixer. The preformed, compounded mixture is then fed to a heated single screw extruder and the molten coating is extruded onto a moving web. Plasticizing aids comprising up to 54% of the formulation are used. It is believed that these plasticizing aids are used to accommodate the coating difficulties normally associated with the extrusion of high viscosity elastomers.

Japanese patent application Sho 50-37692 to Fukugawa et al. discloses a similar process of pre-masticating mixtures of ingredients of pressure sensitive adhesives for 25 minutes, supplying the premasticated mixtures to a heated extruder, extruding the materials at 230° C. onto a substrate, and curing the extruded materials by exposing them to electron beam radiation to enhance the cohesive strength of the adhesive and improve the bond to the backing. The materials described include non-thermoplastic elastomers of natural rubber and styrene-butadiene rubber (SBR). In the two examples utilizing natural rubber, the natural rubber was blended with a styrene-butadiene elastomer and a plasticizing aid. The plasticizing aid equaled about 87.5% of the total rubber charge, and no tackifiers were used. The non-natural rubber example included 25.8% plasticizing aid.

German provisional patent publication P-19 54 214.4 to Pyton AG discloses an extrusion process for the preparation of pressure sensitive adhesives which does not necessitate a separate pre-mastication step. A twin screw extruder is used to continuously compound and coat a formulation comprised of five different types of materials. Natural rubber and/or partially vulcanized rubber, latex, polybutene with a molecular weight between 70,000 and 200,000, and polyisobutylene with a molecular weight between 100,000 and 250,000 comprise the cohesive component. Four other classes of ingredients are required to accommodate this process. These other ingredients include low molecular weight (less than 15,000) polybutene and polyisobutylene or native bitumen, reactive and/or non-reactive resins, antioxidants, and various metal oxide fillers. No specific compositions are taught, but the levels of plasticizing aids such as bitumen, or the low molecular weight polyisobutylene or polybutene are reported to range from 10 to 20%.

U.S. Pat. No. 2,199,099 to Cunningham discloses that air and oxygen enriched gases can be used to facilitate the oxidative breakdown of natural rubber in an internal mixer to reduce the molecular weight of the rubber. A continuous hot melt extrusion process that employs the air-assisted oxidative break-down of natural rubber followed by the addition of tackifiers and phenolic resin vulcanizing agent to form a thermosettable adhesive is known. In this process the molecular weight of the natural rubber is reduced to such a degree that when the phenolic resin is added, the combination of the rubber and resin can be processed at a temperature below that at which vulcanization occurs.

U.S. Pat. No. 5,158,725 to Handa et al. disclose a process utilizing a twin screw extruder to compound non-thermoplastic elastomers with fillers, additives, oil, another elastomer, pigments and/or curatives. The components are fed at controlled rates through a feed opening or openings to mix the elastomer with the non-elastomer components as they are added to provide a mixture while controlling the melt temperature, pressure, and torque required by the extruder. It further discloses a computerized control system to automate the process. It is also described that the elastomer or elastomers and other additives are added and masticated along the length of the screw to control mix, temperature and final melt viscosity.

U.S. Pat. No. 5,539,033 to Bredahl et al. discloses a continuous hot melt process for preparing a non-thermosettable, pressure sensitive adhesive from tackified high molecular weight non-thermoplastic hydrocarbon elastomer or elastomers. The process described uses a twin screw extruder employing sequential feed ports and alternating conveying and mixing sections to masticate and mix the components. The elastomer or elastomers can be fed in a single section, for example, section 1, and initial elastomer mastication occurs in the absence of tackifier. However, it is also described that the elastomers may be added sequentially to different conveying and processing sections. It is further described that mastication is preferably carried out in the absence of materials which will lubricate the elastomer (for example, a plasticizing aid) and prevent reduction of its molecular weight but that the presence of small amounts of such materials is not precluded, provided that the amount present does not effectively reduce the rate of mastication.

It is desirable to improve known hot melt compounding and extrusion of non-thermoplastic hydrocarbon elastomers using a single elastomer base to make pressure sensitive adhesives having the properties needed for high performance PSA tapes, such as high temperature masking, and medical tapes. In general, multi-polymer based pressure sensitive adhesives are needed to provide shear resistance in differing temperature ranges and peel rates; these resulting multi-polymer based adhesives typically exhibit a shear resistance over a broader range of temperatures and peel rates which in turn allows the coated tape to perform over a wider range of environmental conditions.

SUMMARY OF THE INVENTION

Thus it would be desirable to provide a practical method of hot melt compounding and coating elastomers at molecular weights and compositions of interest to the PSA industry at optimized maximum throughput rates to minimize capital expense and production costs. Continuous hot melt processing of high molecular weight polymer(s) based adhesive compositions using a process which masticates and mixes the polymer(s) prior to addition of tackifier, or masticates and mixes the polymer(s) in the presence of tackifier has not been possible at relatively high throughput rates.

One aspect of the present invention provides a continuous solventless hot melt process for preparing a pressure sensitive adhesive composition. The method preferably includes providing a first elastomer to a first conveying section of a continuous compounding device and masticating and mixing the first elastomer for a time sufficient to produce a masticated first elastomer having a melt viscosity less than the melt viscosity of the first elastomer prior to masticating and mixing. The method also includes adding a second elastomer to the masticated first elastomer in a second conveying section of the continuous compounding device, wherein the second elastomer is the same or a different elastomer than the first elastomer. The second elastomer is masticated and mixed with the masticated first elastomer. The method also preferably includes adding an elastomer-compatible tackifier; and forming an adhesive composition comprising the first elastomer, the second elastomer and the elastomer-compatible tackifier at a throughput of more than about 5.4 kg/hr/l free volume, preferably about 10.0 kg/hr/l free volume, of the continuous compounding device.

Another aspect of the present invention provides a continuous process for preparing an adhesive composition. The process includes masticating and mixing a first elastomer and a first portion of a first elastomer-compatible tackifier in a first processing section and transporting the masticated elastomer and the first portion of the first elastomer-compatible tackifier to a second processing section. A second portion of the first elastomer-compatible tackifier can be masticated and mixed with the masticated elastomer and the first portion of the first elastomer-compatible tackifier to form a blend. A third portion of the first elastomer-compatible tackifier can also be added to the blend to form an adhesive composition from the blend.

Another aspect of the present invention provides a process for preparing an adhesive article. One preferable method includes providing a continuous process for preparing an adhesive composition that includes masticating and mixing a first elastomer and a first portion of a first elastomer-compatible tackifier in a first processing section; transporting the masticated elastomer and the first portion of the first elastomer-compatible tackifier to a second processing section; masticating and mixing a second portion of the first elastomer-compatible tackifier with the masticated elastomer and the first portion of the first elastomer-compatible tackifier to form a blend; adding a third portion of the first elastomer-compatible tackifier to the blend; and forming an adhesive composition from the blend. The method also includes depositing the adhesive composition on a web.

DETAILED DESCRIPTION OF THE INVENTION

The present invention is directed to a continuous compounding process that is capable of producing a substantially homogeneous blend useful in the manufacture of pressure sensitive adhesives. In accordance with the present invention, when at least one elastomer is to be processed in the invention, it may be added to a first conveying section and masticated in a first processing section. Alternatively, it may be added sequentially to different conveying sections with sequential mastication after addition of the at least one elastomer. Sequential elastomer addition to different conveying and/or processing sections may also be employed when more than one elastomer is used, particularly when one elastomer is incompatible with other elastomers that may be included in the pressure sensitive adhesive composition.

In order to facilitate the description of the invention, the following terms used herein shall have the following meanings:

"Pressure sensitive adhesive" (PSA) shall refer to an adhesive composition that satisfies the Dahlquist criterion, i.e., a 1-sec creep compliance greater than $1 \times 10^{-6}$ cm$^2$/dyne, as defined in *Handbook of Pressure Sensitive Adhesive Technology*, p. 172, D. Satas (ed.), Van Nostrand, N.Y., (1989). Typically, a pressure sensitive adhesive is normally tacky at room temperature and adheres to a surface upon contact to the surface without the need for more than finger or hand pressure.

"Elastomer" shall mean a hydrocarbon homopolymer or copolymer as distinguished from a block copolymer. Preferably the elastomer is a non-thermoplastic hydrocarbon elastomer. Non-thermoplastic hydrocarbon elastomer shall means a hydrocarbon homopolymer or copolymer as distinguished from a block copolymer. When two or more different elastomers are present in an adhesive composition, compatibility of the elastomers can be determined by dynamic mechanical analysis of the resulting composition. Two or more elastomers are said to be incompatible when a dynamic mechanical analysis by temperature and/or frequency sweep of the resulting composition shows distinct peaks in the tangent of the phase angle shift response at defined temperatures, which suggests a distinct glass transition temperature for each of the elastomers in the composition. On the other hand, elastomers are said to be compatible when the resulting composition exhibits a single glass transition temperature irrespective of the number of elastomers in the composition.

"Tackifier" shall mean a material which is miscible with at least one hydrocarbon elastomer employed in the process, has a number average molecular weight $M_n$ of 10,000 grams per mol (g/mol) or less and a glass transition temperature $T_g$ of -30° C. or more as measured by differential scanning calorimetry (DSC) and imparts tack and pressure sensitive adhesive properties to the resulting composition.

"Elastomer-compatible tackifier" shall refer to a relationship between an elastomer and a tackifier that may be added when forming an adhesive composition, wherein compatible or compatibility can be identified (in shear modulus in dynes/cm$^2$ versus temperature plot) by a shift of the phase angle tangent of the peak temperature associated with a sharp decease in the storage modulus in the rubbery plateau region as described in *Handbook of Pressure Sensitive Adhesive Technology*, p. 176–177 ($2^{nd}$ D. Satas) (1989). Compatibility of a tackifier depends upon the structure, molecular weight, and concentration of the tackifier in the adhesive composition, such that the adhesive composition exhibits pressure sensitive adhesive properties, as defined above. A tackifier and an elastomer are said to be incompatible when the resulting composition does not exhibit pressure sensitive adhesive properties, i.e., having a 1-sec creep compliance less than about $1 \times 10^{-6}$ cm$^2$/dynes after storage for a commercially practical period of time, typically about three months or more.

"Continuous compounding" shall refer to a process wherein components can be added directly to a device (either at a single point or in a sequence) without the need for batch preparation of a sub-combination of components, sometimes referred to as a "pre-batch." A pre-batch is typically mixed in a separate mixer, such as an internal Banbury mixer or a two-roll mill, and then the pre-batch is transferred to another device for blending. In continuous compounding, all components can be added to a device for mixing and blending to form an adhesive composition.

"Throughput" shall refer to a mass flow rate in kilograms/hour/liter of free volume available in an extruder compounder device. The free volume (also referred to as "FV") shall refer to that volume of a compounder device that is available for processing components to form a pressure sensitive adhesive, i.e., the free volume accounts for machinery that may be present in the interior of the device. The free volume of a particular extruder compounder is typically readily available from its manufacturer or it can be determined empirically. To determine FV empirically, an extruder barrel section is closed off at one end with tape. The extruder barrel section is then tipped vertically such that the closed end is at the bottom, then the screw elements that have had their shaft openings or bores closed with tape are inserted into the barrel section to fill the barrel section. Fluid is added until it reaches the top of the screw elements. The volume of fluid added to the barrel section is measured and then divided by the length of the screw elements. That result is the free volume of liquid per unit length, which is then multiplied by the total length of the compounder screw to arrive at a total free volume value for the compounder.

Continuous Compounding Process

Continuous compounding in accordance with the present invention is particularly advantageous in order to achieve relatively high throughput rates where the adhesive composition components have widely different viscosities and molecular weights. For high throughput rates, mixing and mastication should preferably occur quickly. However, a nonhomogeneous blend may result when components having a higher viscosity relative to the other components pass through the continuous compounder as macroscopic agglomerates, visible to the unaided eye, without mixing with the other components.

A continuous compounding device is preferably utilized in accordance with the present invention. A number of such devices are known. Continuous compounding devices may comprise a single unit or a series of units interconnected. An example of a continuous compounding device useful in the present invention is a twin screw extruder having a sequential series of conveying and processing sections, such as that described in U.S. Pat. No. 5,539,033 (Bredahl et al.).

A plurality of input openings can be provided along the length of a continuous extruder to facilitate the addition of various materials such as elastomers, elastomer-compatible tackifiers, fillers, antioxidants, plasticizing aids, radiation enhancers such as electron beam radiation sensitizers and photoinitiators, and other additives known in the art. Additions of material, whether elastomer, tackifier, or other additives, are made through input ports to a partially full conveying section. A melt pump and filter may be present either as an integral part of the extruder, or as a separate unit to facilitate both the removal of the adhesive from the continuous compounding device and the removal of unwanted contaminants from the adhesive stream.

In particular, the method of the present invention may include providing a continuous compounding device having a twin screw therein that has a sequence of conveying and processing sections that alternate with one another and feeding the first non-thermoplastic hydrocarbon elastomer and at least a portion of the elastomer-compatible tackifier to the first conveying section at a controlled rate so that the first conveying section is not completely filled by the first elastomer and the elastomer-compatible tackifier. Also included are the steps of transporting the first non-thermoplastic hydrocarbon elastomer and the at least a portion of the elastomer-compatible tackifier to a first processing section; and masticating and mixing the first non-thermoplastic hydrocarbon elastomer and the at least a portion of the elastomer-compatible tackifier to produce a masticated mixture having a melt viscosity less than the melt viscosity of the first non-thermoplastic hydrocarbon elastomer prior to masticating and mixing. The second non-thermoplastic hydrocarbon elastomer can be added to the masticated mixture in the second conveying section, and the second non-thermoplastic elastomer and the masticated mixture can be masticated and mixed. The method can also include adding a second portion of the elastomer-compatible tackifier and an adjuvant to form an adhesive composition; and discharging the adhesive composition from the device.

The method may further include providing a continuous compounding device having a twin screw therein which has a sequence of conveying and processing sections that alternate with one another and feeding at least a portion of the first elastomer and the first portion of the first elastomer-compatible tackifier to a first conveying section at a controlled rate so that the first conveying section is not completely filled by the elastomer and the first elastomer-compatible tackifier. The at least a portion of the first elastomer and the first portion of the first elastomer-compatible tackifier can be transported to the first processing section. The at least a portion of the first elastomer and the first portion of the first elastomer-compatible tackifier is masticated and mixed to produce a masticated mixture having a melt viscosity less than the melt viscosity of the first elastomer prior to masticating and mixing. Preferably, a second portion of the first elastomer-compatible tackifier is added to the masticated mixture. The second portion of the first elastomer-compatible tackifier and the masticated mixture can be transported to a second processing section. The second portion of the first elastomer-compatible tackifier and the masticated mixture is masticated and mixed to form a blend. The blend can be transported to a third conveying section and a third portion of the first elastomer-compatible tackifier is added to the blend. An adhesive composition is formed from the third portion of the first elastomer-compatible tackifier and the blend; and discharged from the device.

Preferably, in the practice of the process of the present invention, an elastomer is added to a first conveying section of a compounding device in an amount of about 25% to about 75% by weight based on the total weight of adhesive, preferably with a portion of an elastomer-compatible tackifier. Preferably, these materials should not completely fill the first conveying section.

The elastomer may be pelletized, by grinding or extrusion pelletization for example, prior to being fed to the compounding device. Alternately, it may be fed directly into the compounding device without grinding or pelletization using a device such as a Moriyama extruder, a Bonnot extruder, or a Davis Standard 2-roll feed extruder. If the elastomer has been pelletized, it is preferably treated with a material such as talc to prevent agglomeration of the pellets.

In one embodiment of a process in accordance with the present invention, a first elastomer is fed, optionally along with a first elastomer-compatible tackifier, to a first conveying section of a continuous compounding device at a controlled rate so that the first conveying section is not completely filled. Preferably, the first elastomer is one that either has a higher molecular weight or is present at a higher weight percent as compared to other components of the adhesive composition. Thus, in one scenario, the first elastomer has a molecular weight that is higher than the molecular weight of any of the other elastomers that may be included in the process. The first conveying section transports the first elastomer, and optionally the first elastomer-compatible tackifier, to a first processing section where the elastomer is masticated and mixed, optionally with the tackifier, thereby lowering its molecular weight and producing a mix with a lower melt viscosity than the first elastomer prior to mastication and mixing.

The masticated mixture is then transported to a second conveying section where it is cooled. Additional first elastomer-compatible tackifier can be added at this point and then subsequently transported to a second processing section. In the second processing section, the tackifier and masticated mixture is masticated and mixed together to form a blend of the elastomer and the tackifier such that the molecular weight and melt viscosity is further reduced. The blend is then transported to a third conveying section where it is cooled. Other components can be added to the third conveying section, such as additional first elastomer-compatible tackifier or a second elastomer. In one embodiment, a second elastomer is preferably added.

When more than one elastomer is included in an adhesive composition, preferably all of a first elastomer is added to the continuous compounder first. Preferably, the first elastomer is added to a first conveying section of the continuous compounder, more preferably, with a first elastomer-compatible tackifier, as described below. Preferably, the first elastomer is one that either has a higher molecular weight or is present at a higher weight percent, i.e. is a major component of the adhesive composition. Additional elastomer(s) (i.e., a second elastomer) is added in a section of the continuous compounder subsequent to the addition of the first elastomer.

Preferably, the process further includes adding a second elastomer to a third processing section, masticating and mixing the first elastomer, the first elastomer-compatible tackifier, and the second elastomer; adding a second elastomer-compatible tackifier; and masticating and mixing the first elastomer, the first elastomer-compatible tackifier, the second elastomer, and the second elastomer-compatible tackifier to form an adhesive composition. Preferably, the first elastomer comprises an aliphatic elastomer and the second elastomer comprises an aromatic elastomer.

Alternatively, when only one elastomer is included in the adhesive composition, a majority of the elastomer is preferably fed in the first conveying section. Preferably, the majority of the elastomer includes from greater than about 50 wt. %, more preferably from about 75 wt. %, and up to about 100 wt. % (but not including 100 wt. %) of a total amount of the elastomer to be included in an adhesive composition.

A sequential continuous compounding process in accordance with the present invention is particularly useful in producing a pressure sensitive adhesive composition including at least two elastomers. Preferably, a first elastomer added to a continuous compounding device in a conveying section is an aliphatic elastomer. More preferably, a second elastomer added to a continuous compounding device is an aromatic elastomer.

The at least one elastomer is preferably fed to a continuous compounding device such that the process of compounding is suitable at a relatively high throughput of more than about 5.4 kg/hr/l free volume of the compounding device, more preferably about 10.0 kg/hr/l free volume or more, and most preferably about 15 kg/hr/l free volume or more. This can be accomplished by the addition of the at least one elastomer in one conveying section, preferably with at least a portion of an elastomer-compatible tackifier. In so doing, the melt viscosity of the masticated mixture is sequentially lowered and the mixture is substantially homogeneous even at the relatively high throughput rates. By "substantially homogeneous" it is meant that all components are uniformly mixed in the composition having a relatively smooth consistency, i.e., the composition is substantially free of macroscopic agglomerates visible to the unaided eye. "Substantially free" refers to preferably less than about 5% by volume of macroscopic agglomerates visible to the unaided eye based on the total volume of the composition. It is contemplated that substantially homogeneous includes a composition that may have more than one phase as determined by dynamic mechanical analysis.

These components may then be transported to a second conveying section where a tackifier or, preferably, a second elastomer is added. These components may then transported to a second processing section where they are masticated and mixed to foam a blend that may then be transported to a third conveying section. In the third conveying section, the blend may be cooled and additional elastomer-compatible tackifier and optional additives (e.g., blowing agents, antioxidants, pigments, and the like) may then be added. Preferably, an elastomer-compatible tackifier is added in the third conveying section. The blend and other additives may then be transported to a third processing section where they are masticated and mixed to form an adhesive composition. The adhesive composition may be transported to a fourth conveying section where it is cooled and discharged from the compounding device.

If included in an adhesive composition, a blowing agent is preferably added to the blend in a fourth conveying section. The blend and the blowing agent are then transported to a fourth processing section where they are masticated and mixed.

Sequential addition and mixing of a first elastomer-compatible tackifier(s) can be made in subsequent conveying and processing sections, respectively, to adjust the first elastomer molecular weight and mixture melt viscosity and temperature to a condition which is most favorable for maximum mixing efficiency, for example, with a second elastomer. Following the mastication and mixing of the second elastomer, additional elastomer-compatible tackifier (whether compatible with the first or second elastomer) may be added to allow for adjusting melt viscosity of the final pressure sensitive adhesive composition. Preferably, a substantially homogenous adhesive composition is formed.

Preferably, in accordance with the present invention, an elastomer-compatible tackifier is added in a sequential manner. The elastomer-compatible tackifier is preferably fed to sequential conveying sections alternating with processing sections. Preferably, the elastomer-compatible tackifier is sequentially fed in an order of addition such that from about 5 wt. % to about 25 wt. % of the total amount of the tackifier to be included in the adhesive composition is provided at a first section of addition.

The method may also include adding a second portion of the elastomer-compatible tackifier. Preferably, the method includes adding at least a portion of the elastomer-compatible tackifier to the first conveying section; and adding a second portion of the elastomer-compatible tackifier to the second conveying section to form a blend having a melt viscosity less than the melt viscosity of the first non-thermoplastic hydrocarbon elastomer.

Preferably, the first portion of the first elastomer-compatible tackifier includes from about 5 wt. % to about 25 wt. % of the total amount of the first elastomer-compatible tackifier. The second portion of the first elastomer-compatible tackifier preferably includes from about 15 wt. % to about 50 wt. % of a total amount of the first elastomer-compatible tackifier. More preferably, a total amount of the first elastomer-compatible tackifier includes the first portion of the first elastomer-compatible tackifier from about 5 wt. % to about 25 wt. %, the second portion of the first elastomer-compatible tackifier from about 15 wt. % to about 50 wt. %, and the third portion of the first elastomer-compatible tackifier from about 30 wt. % to about 75 wt. %. For example, in a second section of addition, from about 15 wt. % to about 50 wt. % of the total amount of the tackifier to be included in the adhesive composition is provided and in a third section of addition, from about 30 wt. % to about 75 wt. % of the tackifier to be included in the adhesive composition is provided.

It is to be understood that the first, second, and third sections of addition of the elastomer-compatible tackifier do not necessarily directly correspond to the first, second, and third conveying sections, respectively. For example, the first point of addition may correspond to the second conveying section if it is desired to masticate and mix a portion of the elastomer in the absence of tackifier. Conversely, it may also be desired to masticate and mix a portion of the elastomer in the presence of a portion of a compatible tackifier. In this instance, the first point of addition of the tackifier corresponds with the first conveying section. A sequential addition of the tackifier is particularly useful in forming a pressure sensitive adhesive composition at relatively high throughput rates, e.g., more than about 5.4 kg/l/hr free volume of the continuous compounding device.

A number of techniques may be used to feed raw materials to the continuous compounder. For example, a constant rate feeder, such as a loss-in-weight feeder commercially available from Acrison Corporation, Moonachie, N.J., may be used to add solid materials. Heated pail unloaders, gear pumps, and other appropriate equipment for feeding liquids at a controlled rates may be used to feed the liquids to the compounding device. Additives present at low concentration may be pre-blended with one or more of the other components for more accurate addition.

A process in accordance with the present invention can employ either aerobic or anaerobic processing. For purposes of this invention, aerobic processing means that gas containing available oxygen (such as compressed air) is intentionally injected into the compounding device so as to promote oxidative breakdown of the elastomer, typically a non-thermoplastic hydrocarbon elastomer. The injection of an oxygen-containing gas may occur into at least one section of a continuous compounding device utilized in the process.

Anaerobic processing means that no oxygen-available gas is intentionally injected into the compounding device, however, minor amounts of air may be present in anaerobic processing in the practice of the invention. Although either aerobic processing or anaerobic processing are suitable, the process of the present invention is preferably an anaerobic process, wherein gas is not intentionally injected into the continuous compounding device.

Aerobic processing may be advantageously utilized when the hydrocarbon elastomer will preferentially undergo chain scission rather than crosslinking and/or chain extension. Aerobic processing allows a greater reduction in the molecular weight of the elastomer in a relatively short period of time. Additionally, aerobic processing allows manufacture at lower temperatures. As a result, thermally sensitive materials may be compounded with the hydrocarbon elastomer in the process of the invention. If aerobic processing is desired, a gas containing available oxygen, such as compressed air, can be readily injected into the compounding device. Preferably air is injected into either a transporting section, or a conveying section situated between two processing sections. Alternatively, the gas can be injected into any processing or conveying section. If the gas comprises compressed air, it is typically injected into the compounding device at a pressure of from 5 to 100 pounds per square inch gauge (psig) (30 to 700 kilopascals (kPa)).

Anaerobic processing may be advantageously utilized to prevent excessive oxidative degradation to achieve a higher molecular weight than would be achieved under aerobic conditions. This increases the cohesive strength of the adhesive and minimizes the degree of later crosslinking needed to provide enhanced cohesive strength.

Once all of the components, e.g., the masticated elastomer, tackifier, and any optional additives (if present), have been formed into the blend, the composition may now be referred to as an adhesive composition. An adhesive composition formed by a process in accordance with the present invention typically has a viscosity at the processing temperature in the range from 400 Poise to 5000 Poise (measured at a shear rate of 1000 $sec^{-1}$ using a capillary rheometer). Higher viscosity adhesives may also be processed in the process of the invention. The processing temperature of the adhesive composition is typically in the range of 100° C. to 200° C., preferably about 120° C. to 160° C. Surprisingly, it was found that these desirable pressure sensitive adhesive composition characteristics can be obtained at relatively high throughput rates by compounding the components in accordance with the present invention. For example, it was found that a desirable adhesive composition was obtained at a throughput of more than about 5.4 kg/hr/l free volume of the continuous compounding device utilized in the process.

The adhesive composition may be discharged from the continuous compounding device into a storage container for later additional processing or use. Alternatively, it may be discharged directly onto a support in the form of a thin film. Preferably, the support is a moving web. The thin adhesive film may be formed by pumping the adhesive through a coating die, optionally with the aid of a gear pump or other suitable device to develop sufficient pressure. The die is preferably of the contacting variety that smears the adhesive onto a moving web supported on a backup roll. Alternatively, the adhesive may be discharged from the compounding device and fed to the coating die using a separate extruder, melt pump, or combination of extruder and melt pump with sufficient pressure to force the adhesive mixture through the die. The adhesive may optionally be filtered prior to feeding to the coating die.

The coated adhesive may optionally be crosslinked by exposure to radiation, such as electron beam or ultraviolet radiation, to enhance the cohesive strength of the material. Crosslinking may be carried out in-line with the coating operation or may occur as a separate process. The degree of crosslinking achieved is a matter of choice and is dependent upon a number of factors such as the end product desired, the elastomer used, the thickness of the adhesive layer, etc. Techniques for achieving crosslinking via exposure to radiation are known to those of skill in the art.

A release coating may also be optionally applied to the web, either before or after application of the adhesive. The release coating may be continuous or discontinuous on the web and is normally on the surface of the web opposite that which ultimately bears the adhesive. The release coating may be applied either in-line with the coating or crosslinking operations, or as a separate process.

As mentioned above, a twin screw extruder is preferably used as the compounding device in the invention. The extruder screw can be configured to masticate the elastomer and mix it with an elastomer-compatible tackifier in a first processing section. A portion of the extruder and screw following the first processing section must be designed to permit the addition and efficient mixing of more elastomer-compatible tackifiers, elastomer and other additives.

Figure 1:
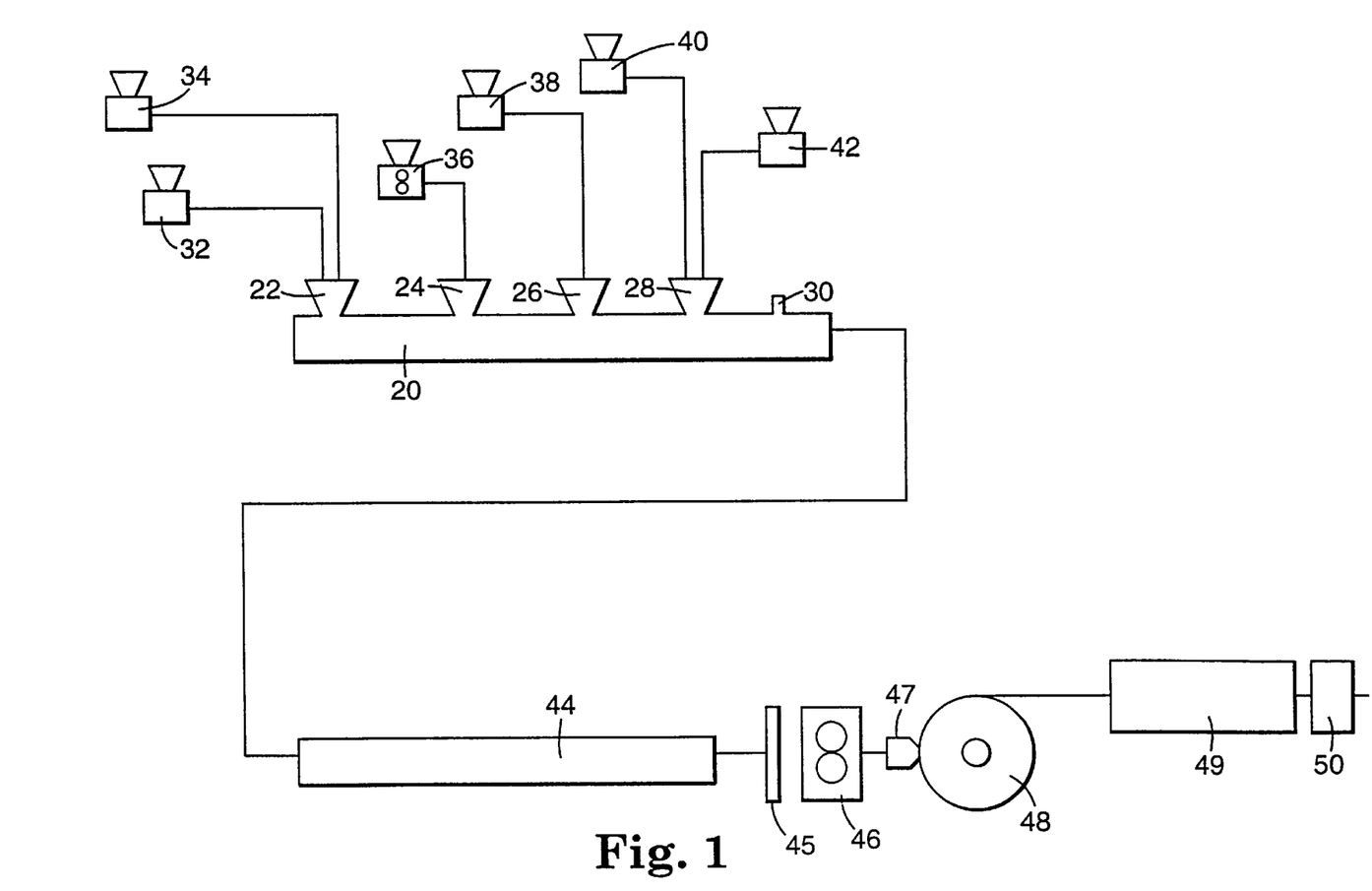
FIG. 1 is a schematic representation of a continuous compounding and coating line useful in the practice of the invention.

A continuous compounding process of the present invention may employ any suitable compounding devices. Exemplary devices will be described with reference to the Figures. The compounding device of FIG. 1 is a co-rotating twin screw extruder 20. The extruder 20 is equipped with a solids feed hopper 22, a liquid tackifier feed port 24, and solids feed hoppers or ports 26 and 28. Loss-in-weight feeders 32, 34, 38, 40, and 42 and a tackifier grid melter with gear pump, both represented by reference numeral 36, control the rate of material delivered to extruder 20. A vent 30 was provided near the discharge of the extruder 20.

Figure 2:
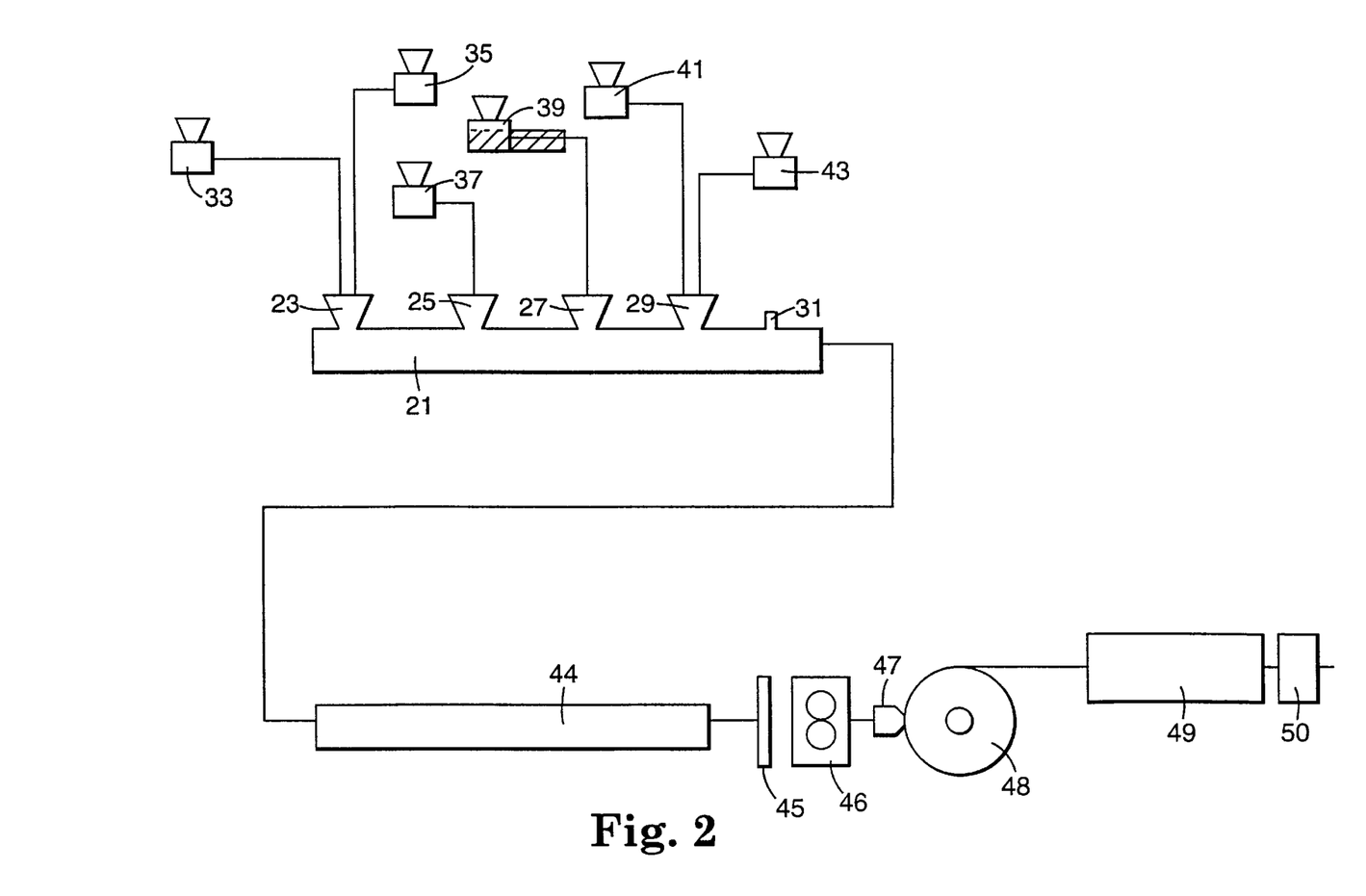
FIG. 2 is a schematic representation of an alternative continuous compounding and coating line useful in the practice of the invention.

The compounding device of FIG. 2 is a co-rotating twin screw extruder 21. The extruder 21 is equipped with a solids feed hopper or ports 23, 25, and 29, and masticated polymer feed port 27. Loss-in-weight feeders 33, 35, 37, 41, and 43 and an elastomer extruder 39 control the rate of material delivered to extruder 21. A vent 31 was provided near the discharge of the extruder 21.

Ancillary equipment to transport, coat, condition, and crosslink the adhesive on tape backings is also shown in FIGS. 1 and 2. This equipment consists of a single screw extruder 44 interposed between the twin screw extruder 20 or 21 and the filter 45. The single screw extruder 44 is used to generate enough pressure to push the adhesive through the filter 45. Additionally the gear pump 46 is used downstream of the filter to meter the adhesive to die 47. The die 47 is a contact extrusion die with a rotating steel rod on the downstream side of the die to smear the adhesive onto the web. The coating roll 48 is a temperature controlled roll with a controlled durometer rubber coating on it. The coated tape can then be passed through a temperature controlled oven 49 if heat sensitive foaming agents are utilized and then to a crosslinking device 50.

Figure 3:
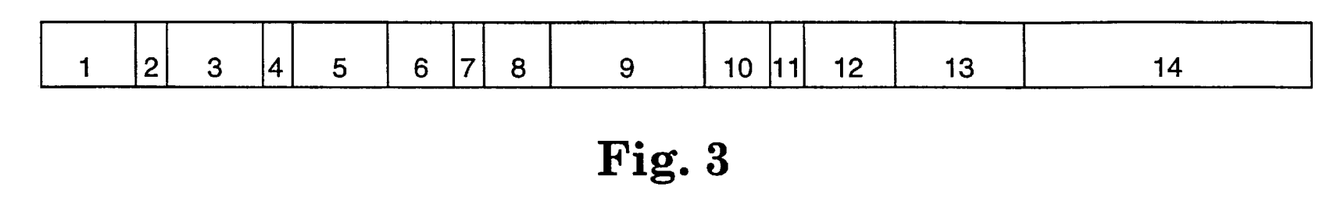
FIG. 3 is a schematic representation of an extruder screw design employing 14 sections.
Figure 4:
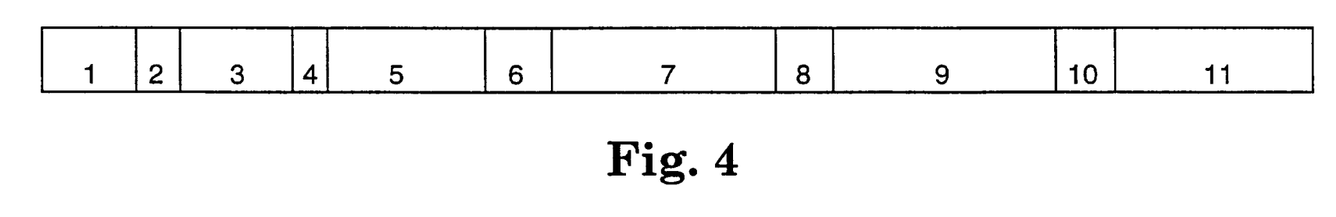
FIG. 4 is a schematic representation of an extruder screw design employing 11 sections.
Figure 5:
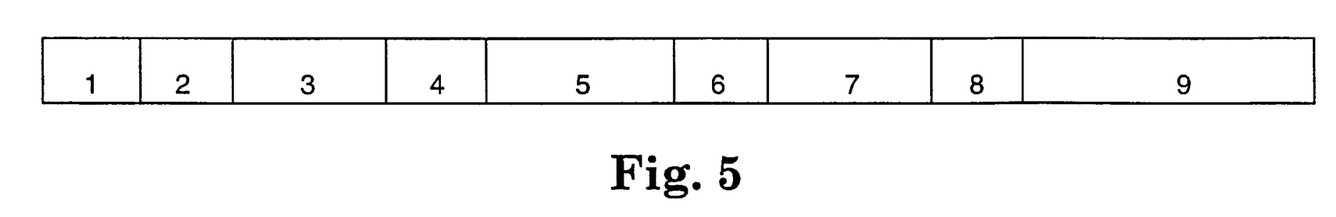
FIG. 5 is a schematic representation of an extruder screw design employing 9 sections.

FIGS. 3 to 5 represent exemplary screw designs. The screw design of FIG. 3 has 14 sections depicted. The screw design of FIG. 4 has 11 sections depicted. The screw design of FIG. 5 has 9 sections depicted. Sections 1, 3, 5, 7, 9, and 11, 13 (if present) represent conveying sections. Sections 2, 4, 6, 8, and 10, 12, 14 (if present) represent processing sections. These screw designs were used to prepare the examples discussed below in the Examples section.

Although the foregoing has been described with particular attention to a twin screw extruder, other techniques employed in a continuous process are equally suitable. Other examples include single screw extruding, disc extruding, reciprocating single screw extruding, pin barrel screw extruding, to name a few.

Elastomers

A wide variety of elastomers can be employed in the present invention. An adhesive composition may include one elastomer or more than one elastomer wherein the elastomer (whether one or more than one) is blended together in accordance with a method of the present invention. Preferably, the one or more than one elastomer (for example, the first and second elastomer) is/are a non-thermoplastic hydrocarbon elastomer.

Examples of non-thermoplastic elastomers include, natural rubber, butyl rubber, synthetic polyisoprene, ethylene-propylene rubber, ethylene-propylene-diene monomer rubber (EPDM), polybutadiene, polyisobutylene, poly(alpha-olefin) olefin) and styrene-butadiene random copolymer rubber. These elastomers are distinguished from thermoplastic elastomers of the block copolymer type such as styrenic-diene block copolymers which have glassy end blocks joined to an intermediate rubbery block. Suitable thermoplastic elastomers are commercially available from a series under the trade designation KRATON 1107, from Shell Chemical Co., Houston, Tex.

In an embodiment of the present invention where a first and second elastomer are employed, preferably the first elastomer includes more than about 50 wt. % to less than about 100 wt. % based on a total amount of elastomer.

Tackifiers

Tackifiers usefull in the invention preferably have a low molecular weight relative to the elastomer, and a Tg higher than that of the elastomer. Examples of usefull elastomer-compatible tackifiers include rosin and rosin derivatives, hydrocarbon tackifier resins, aromatic hydrocarbon resins, aliphatic hydrocarbon resins, terpene resins, etc. Suitable aliphatic hydrocarbon tackifiers are commercially available under the trade designations of ESCOREZ 1310, from Exxon, Baton Rouge, La.; and PICCOTAC B, from Hercules, Panama City, Fla. Typically the tackifier comprises from 10 to 200 parts by weight per 100 parts by weight of the elastomer.

Optional Additives

Optional additives such as antioxidants, fillers, plasticizing aids, blowing agents, radiation enhancers, and combinations thereof may be included.

When a foamed pressure sensitive adhesive is desired, the blowing agent may be added to the adhesive composition at a temperature below that of the decomposition temperature of the blowing agent. It is then mixed at such a temperature to distribute it throughout the adhesive composition in undecomposed form. Preferably the blowing agent comprises from 0.5 to 5 weight percent of the adhesive layer. However, lesser or greater amounts may be utilized if desired.

Useful blowing agents typically decompose at a temperature of 140° C. or above. Examples of such materials include synthetic azo-, carbonate-, and hydrazide-based molecules. Specific examples of these materials are those commercially available under the following trade designations: CELOGEN OT (4,4' oxybis (benzenesulfonylhydrazide), CELOGEN AZ (azodicarboxamide) and CELOGEN RA (p-toluenesulfonyl semicarbazide) all from Uniroyal Chemical, Middlebury, Conn.; and HYDROCEROL BIF (preparations of carbonate compounds and polycarbonic acids) from Boehringer Ingleheim, Ingleheim, Germany.

Once dispersed, the blowing agent may be activated after extrusion by, for example, heating the extrudate to a temperature above its decomposition temperature. Decomposition of the blowing agent liberates gas, such as $N_2$, $CO_2$ and/or $H_2O$, and creates cell structure throughout the adhesive mass. Decomposition may be done before or after the adhesive is cured.

Examples of other additives include antioxidants, such as hindered phenols, amines, and sulphur and phosphorous hydroperoxide decomposers; inorganic fillers such as talc, zinc oxide, titanium dioxide, aluminum oxide, and silica; plasticizing aids such as those materials described as plasticizers in the *Dictionary of Rubber*, K. F. Heinisch, pp. 359, John Wiley & Sons, N.Y. (1974), oils, elastomer oligomers and waxes; and the like. Typically the antioxidant comprises up to 5 parts by weight per 100 parts by weight elastomer; and an inorganic filler comprises up to 50 parts by weight per 100 parts by weight of elastomer.

"Plasticizing aid" shall mean a material which has an $M_n$ of less than 50,000 g/mol and a $T_g$ of less than −30° C. as measured by DSC and lowers the viscosity of the resulting composition. Preferably, the use of plasticizing aids is unnecessary. If a plasticizing aid is used, it should not prevent effective mastication of the elastomer, typically not exceeding about 10 percent by weight of the total adhesive composition. Preferably, it comprises from 0 to about 8.5 percent by weight of the adhesive composition and more preferably less than 10% by weight of the elastomer. The plasticizing aid may be incorporated prior to, during, or after the mastication of the elastomer.

Pressure Sensitive Adhesive Articles

As mentioned above, a pressure sensitive adhesive composition described above can be deposited on a web, preferably as a thin film. A number of organic and inorganic materials may be used as the web in the practice of the present invention. Such materials include polymeric films, metallic foils, paper, cloth, plastic/cloth combinations, ceramic films, combinations thereof and the like.

Furthermore, the web may comprise a plurality of fibers in a mat-like construction. The fibers may be combined to form either a woven or a non-woven (i.e., randomly arranged collection of fibers) web. The adhesive composition made in accordance with the present invention can be applied to a moving web, preferably in the form of a thin film, directly from the compounding device so as to provide a continuous method for the manufacture of a PSA tape.

The process of the invention can make virtually any PSA tape. Examples of such tapes include masking tape, packaging tape (such as box sealing and strapping tapes), duct tape, cloth tape, decorative tape, protective tape and film, label stock, diaper closure tape, medical tape (such as surgical and athletic tapes), etc. Additionally, the process can be used to make any article having a layer of a hydrocarbon elastomer-based PSA on a backing.

A method for preparing an adhesive article includes providing a continuous process that includes masticating and mixing a first elastomer and a first portion of a first elastomer-compatible tackifier in a first processing section; transporting the masticated elastomer and the first portion of the first elastomer-compatible tackifier to a second processing section; masticating and mixing a second portion of the first elastomer-compatible tackifier with the masticated elastomer and the first portion of the first elastomer-compatible tackifier to form a blend; adding a third portion of the first elastomer-compatible tackifier to the blend; and forming an adhesive composition from the blend. The method also includes depositing the adhesive composition on a web. An adhesive composition of the present invention is preferably formed at a processing temperature of about 100° C. to about 200° C.

A process in accordance with the present invention overcomes the disadvantages of conventional processing and mixing techniques, such as those discussed above. Further, a process in accordance with the present invention permits the processing of elastomers, especially non-thermoplastic hydrocarbon elastomer, preferably high molecular weight non-thermoplastic hydrocarbon elastomers, at high throughput rates. Advantageously, a method in accordance with the present invention can be utilized without the need to employ either organic solvents or low molecular weight plasticizing aids.

In addition, the process of the invention can accommodate even high molecular weight hydrocarbon elastomers at relatively high throughput rates, wherein "high molecular weight elastomer" refers to a viscosity average molecular weight ($M_v$) of 250,000 or more. As discussed above, it has been previously thought that such elastomers could only be compounded and applied if solvent or water processing techniques were utilized, if significant amounts of low molecular weight plasticizing aids were employed, or at throughput rates of less than about 5.4 kg/hr/l free volume.

This invention is illustrated by the following examples, but the particular materials and amounts thereof recited in these examples, as well as other conditions and details should not be construed to unduly limit this invention.

EXAMPLES

The examples employed continuous compounding, coating, conditioning, and crosslinking equipment in accordance with FIGS. 1 and 2. The configuration represented by FIG. 1 was used in Comparative Examples A, B, and C. The configuration represented by FIG. 2 was used in Example 1. FIG. 3 is a schematic representation of the screw used in Comparative Examples A and B; FIG. 4 was used in Comparative Example C; and FIG. 5 is a schematic representation of the screw used in Example 1.

For purposes of the examples, the compounding device employed in FIG. 1 was a co-rotating twin screw extruder 20, commercially available under the trade designation of Werner-Pfleiderer Model ZSK-90 (abbreviated "W&P" herein), from Werner-Pfleiderer Corporation, Ramsey, N.J. and the loss-in-weight feeders 32, 34, 38, 40, and 42 were commercially available from Acrison Corporation, Moonachie, N.J. and the tackifier grid melter was available from May Coating Technologies Inc., White Bear Lake, Minn.

The compounding device employed in FIG. 2 was a co-rotating twin screw extruder 21, commercially available under the trade designation of Werner-Pfleiderer Model ZSK-90 (abbreviated "W&P" herein), from Werner-Pfleiderer Corporation, Ramsey, N.J. The loss-in-weight feeders 33, 35, 37, 41, and 43 were commercially available from Acrison Corporation, Moonachie, N.J., and the elastomer extruder 39 was commercially available from Moriyama. The gear pump 46 was commercially available from Zenith Products Company, West Newton, Mass.

Various screw configurations were used throughout the examples. The dimensions of the various sections of each screw design and the Examples in which they were used are set out in Table I below.

TABLE I

| | Length(mm) | | | |
|---|---|---|---|---|
| Screw design: | FIG. 3 | FIG. 3 | FIG. 4 | FIG. 5 |
| Example: | Comp. Ex. A | Comp. Ex. B | Comp. Ex. C | Example 1 |
| Section 1 | 402 | 402 | 422 | 302 |
| Section 2 | 80 | 80 | 120 | 160 |
| Section 3 | 160 | 160 | 360 | 340 |
| Section 4 | 80 | 80 | 80 | 160 |
| Section 5 | 520 | 520 | 280 | 320 |
| Section 6 | 200 | 200 | 200 | 200 |
| Section 7 | 120 | 120 | 600 | 520 |
| Section 8 | 120 | 120 | 120 | 160 |
| Section 9 | 360 | 360 | 600 | 1220 |
| Section 10 | 120 | 120 | 120 | — |
| Section 11 | 120 | 120 | 480 | — |
| Section 12 | 120 | 120 | — | — |
| Section 13 | 360 | 360 | — | — |
| Section 14 | 600 | 600 | — | — |
| Total length: | 3362 | 3362 | 3382 | 3382 |

—indicates that this section was not present

Comparative Example A:

CV-60 natural rubber elastomer was ground to approximately 0.64 cm (¼ inch) diameter pieces using a REITZ rubber grinder commercially available from Hosokawa Bepex Corp., Santa Rosa, Calif., followed by a grinder, commercially available from Pallman Pulverizer Company, Inc., Clifton, N.J., which dusted the rubber particles with a light talc coating. Styrene butadiene rubber (SBR) elastomer commercially available under the trade designation AMERIPOL/SYNPOL 1011A, from Ameripol Synpol Corp., Port Neches, Tex., was chopped into 2.5 cm (1 inch) diameter particles using a REITZ chopper followed by a Pallman grinder.

The CV-60 was fed at a rate of 24.4 kg/hr (53.9 lbs/hr) with the SBR at a rate of 20.1 kg/hr (44.1 lbs/hr) to section I of the screw shown in FIG. 3 which was installed in the twin screw extruder 20 of FIG. 1, using loss-in-weight feeders, available from Acrison, which continuously monitored the weight of the material in the hopper. The elastomers with talc were transported from section I to section 2 of the screw and were masticated in section 2. The partially masticated elastomers were transported through and cooled in section 3 to section 4 where additional mastication occurred. The masticated elastomers were then transported and cooled in section 5 and delivered to section 6 where hot melted elastomer-compatible tackifier, available under the trade designation ESCOREZ 1304, from EXXON Chemicals, was injected into the extruder to mix with the masticated elastomers at a rate of 4.4 kg/hr (9.8 lbs/hr) by a tackifier grid melter from May Coating Technologies Inc. The feed rate was controlled by a metering gear pump and a calibration curve.

The elastomer and elastomer-compatible tackifier mixture was then transported through and cooled in section 7 and delivered to section 8 where additional mastication or mixing occurred. Additional ESCOREZ 1304 elastomer-compatible tackifier was added at a rate of 6.7 kg/hr (14.7 lbs/hr) from an Acrison loss-in-weight feeder and W&P side stuffer to section 9 of the extruder. The elastomer and elastomer-compatible tackifier mixture was cooled and transported to section 10 where additional mastication occurred. The elastomer and elastomer-compatible tackifier mixture was then transported through and cooled in section 11 and delivered to section 12 where additional mastication or mixing occurred. A blend of 11.1 kg/hr (24.5 lbs/hr) of ESCOREZ 1304, 0.91 kg/hr (2.0 lbs/hr) of TITANOX 2020 from Kronos Corp., Waltham, Mass., and 0.41 kg/hr (0.9 lbs/hr) of IRGANOX 1010 from Ciba-Geigy, Switzerland, were fed from an Acrison loss-in-weight feeder and W&P side stuffer to section 13 of the extruder. This blend was cooled and transported to section 14 where the final mastication or mixing occurred which formed an adhesive composition. The adhesive composition was then transported, cooled, and discharged from the extruder. The extruder was operated in a full cooling mode from section 2 to the end and the screw speed was maintained at 150 RPM.

The quality of the adhesive composition was determined to be substantially homogeneous by visual inspection and the exit temperature was measured with a hand held insertion probe thermocouple at 137° C. (278° F.). The maximum allowable temperature for this adhesive is 141° C. (285° F.). Total through put in this example was 68 kg/hr (150 lbs/hr) or at a throughput of about 5.4 kg/hr/l free volume of the continuous compounding device. This is the maximum throughput achieved with a good mix using this material addition sequence of combined elastomer feeds followed by three sequential elastomer-compatible tackifier and adjuvant additions.

Comparative Example B:

CV-60 natural rubber was ground to approximately 0.64 cm (¼ inch) diameter pieces using a REITZ chopper followed by a Pallman grinder which dusted the rubber particles with a light talc coating. AMERIPOL/SYNPOL 1011A SBR was chopped into 2.5cm (1 inch) diameter particles using a REITZ chopper followed by a Pallman grinder.

The CV-60 was fed at a rate of 57.1 kg/hr (125.8 lbs/hr) with the SBR at a rate of 46.7 kg/hr (102.9 lbs/hr) to section 1 of the screw shown in FIG. 3 which was installed in the twin screw extruder 20 of FIG. 1, using loss-in-weight feeders, available from Acrison, which continuously monitored the weight of the material in the hopper. The elastomers with talc were transported from section 1 to section 2 of the screw and were masticated in section 2. The partially masticated elastomers were transported through and cooled in section 3 to section 4 where additional mastication occurred. The masticated elastomers were then transported and cooled in section 5 and delivered to section 6 where hot melted elastomer-compatible tackifier, available under the trade designation ESCOREZ 1304, was injected into the extruder to mix with the masticated elastomers at a rate of 10.4 kg/hr (22.9 lbs/hr) by a tackifier grid melter from May Coating Technologies Inc. The feed rate was controlled by a metering gear pump and a calibration curve.

The elastomer and elastomer-compatible tackifier mixture was then transported through and cooled in section 7 and delivered to section 8 where additional mastication or mixing occurred. Additional ESCOREZ 1304 was added at a rate of 15.6 kg/hr (34.3 lbs/hr) from an Acrison loss-in-weight feeder and W&P side stuffer to section 9 of the extruder. The elastomer and elastomer-compatible tackifier mixture was cooled and transported to section 10 where additional mastication occurred. The elastomer and elastomer-compatible tackifier mixture was then transported through and cooled in section 11 and delivered to section 12 where additional mastication or mixing occurred. A blend of 26.0 kg/hr (57.2 lbs/hr) of ESCOREZ 1304, 2.09 kg/hr (4.6 lbs/hr) of TITANOX 2020, and 1.04 kg/hr (2.3 lbs/hr) of IRGANOX 1010 were fed from an Acrison loss-in-weight feeder and W&P side stuffer to section 13 of the extruder. This blend was cooled and transported to section 14 where the final mastication or mixing occurred which formed an adhesive composition. The adhesive composition was then transported, cooled, and discharged from the extruder. The extruder was operated in a full cooling mode from section 5 to the end and the screw speed was maintained at 250 RPM.

The quality of the adhesive composition was determined to be substantially homogeneous by visual inspection and the exit temperature was measured with a hand held insertion probe thermocouple at 161° C. (322° F.). However, the maximum allowable temperature for this adhesive is 141° C. (285° F.). Total through put in this example was 158.7 kg/hr (350 lbs/hr) or at a throughput of about 12.7 kg/hr/l free volume of the continuous compounding device. This is the maximum through put achieved with a good mix using this material addition sequence of combined elastomer feeds followed by three sequential elastomer-compatible tackifier and adjuvant additions.

Comparative Example C:

CV-60 natural rubber was ground to approximately 0.64 cm (¼ inch) diameter pieces using a REITZ chopper followed by a Pallman grinder which dusted the rubber particles with a light talc coating. AMERIPOL/SYNPOL 1011A was chopped into 2.5 cm (1 inch) diameter particles using a REITZ chopper and Pallman grinder.

The CV-60 was fed at a rate of 89.9 kg/hr (197.7 lbs/hr) with the SBR at a rate of 73.5 kg/hr (161.8 lbs/hr) and ESCOREZ 1304 at 16.3 kg/hr (35.9 lbs/hr) to section 1 of the screw shown in FIG. 4 which was installed in the twin screw extruder 20 of FIG. 1, using Acrison loss-in-weight feeders which continuously monitored the weight of the material in the hopper. The elastomers with talc and elastomer-compatible tackifier were transported from section 1 to section 2 of the screw and were masticated in section 2. The partially masticated elastomers and elastomer-compatible tackifier were transported through and cooled in section 3 to section 4 where additional mastication occurred. The masticated elastomers and elastomer-compatible tackifier were then transported and cooled in section 5 and delivered to section 6 where hot melted elastomer-compatible tackifier, ESCOREZ 1304 was injected into the extruder to mix with the masticated elastomers and elastomer-compatible tackifier at a rate of 16.3 kg/hr (3 5.9 lbs/hr) by a tackifier grid melter from May Coating Technologies Inc. The feed rate was controlled by a metering gear pump and a calibration curve.

The elastomer and elastomer-compatible tackifier mixture was then transported and cooled in section 7. ESCOREZ 1304 was added at a rate of 24.5 kg/hr (53.9 lbs/hr) from an Acrison loss-in-weight feeder and W&P side stuffer attached to section 7 of the extruder and the adhesive was cooled and transported to section 8 where additional mastication occurred. The elastomer and elastomer-compatible tackifier mixture was then transported and cooled in section 9. A blend of 40.9 kg/hr (89.9 lbs/hr) of ESCOREZ 1304, 3.3 kg/hr (7.2 lbs/hr) of TITANOX 2020, and 1.6 kg/hr (3.6 lbs/hr) of IRGANOX 1010 were fed from an Acrison loss-in-weight feeder and W&P side stuffer to section 9 of the extruder and the adhesive was cooled and transported to section 10 where the final mastication or mixing occurred. The adhesive composition was then transported and cooled through section 11 of the extruder and discharged from the extruder. The extruder was operated in a full cooling mode from section 4 to the end and the screw speed was maintained at 300 RPM.

The quality of the mix was determined to be substantially homogeneous by visual inspection and the exit temperature was measured with a hand held insertion probe thermocouple at 162° C. (324° F.). The maximum allowable temperature for this adhesive is 141° C. (285° F.). Total throughput in this example was 249 kg/hr (550 lbs/hr) or a throughput of about 20 kg/hr/l free volume of the continuous compounding device. This is the maximum through put achieved with a good mix using this material addition sequence of combined elastomer feeds with elastomer-compatible tackifier followed by three sequential elastomer-compatible tackifier and adjuvant additions.

EXAMPLE 1

CV-60 natural rubber was ground to approximately 0.64 cm (¼ inch) diameter piece, using a REITZ chopper followed by a Pallman grinder which dusted the rubber particles with a light talc coating.

The CV-60 was fed at a rate of 122.3 kg/hr (269.6 lbs/hr) and elastomer-compatible tackifier ESCOREZ 1304 at 18.2 kg/hr (40.2 lbs/hr) to section 1 of the screw shown in FIG. 5 which was installed in the twin screw extruder 21 of FIG. 2, using Acrison loss-in-weight feeders which continuously monitored the weight of the material in the hoppers. The CV-60 with talc and elastomer-compatible tackifier were transported from section 1 to section 2 of the screw and were masticated in section 2. The partially masticated elastomer and elastomer-compatible tackifier were transported through and cooled in section 3 where additional ESCOREZ 1304 was added at a rate of 45.4 kg/hr (100 lbs/hr) using a Acrison loss-in-weight feeder to section 4 where additional mastication occurred. The masticated adhesive was then transported and cooled in section 5 where AMERIPOL/SYNPOL 1011A SBR was injected from a Moriyama extruder at a rate of 100.0 kg/hr (220.6 lbs/hr) and delivered to section 6 where additional mastication or mixing occurred. The adhesive mixture was then transported through and cooled in section 7 where a blend of 13.8 kg/hr (30.4 lbs/hr) of ESCOREZ 1304, 4.54 kg/hr (10 lbs/hr) of TITANOX 2020 and 1.81 kg/hr (4 lbs/hr) of IRGANOX 1010 was combined with another ESCOREZ 1304 feed at a rate of 36.4 kg/hr (80.0 lbs/hr) from another Acrison loss-in-weight feeder and added to the extruder using a W&P side stuffer and delivered to section 8 where additional mastication or mixing occurred. The adhesive composition was then transported and cooled through section 9 of the extruder and discharged from the extruder. The extruder was operated in a full cooling mode from section 2 to the end and the screw speed was maintained at 200 RPM.

The quality of the mix was determined to be substantially homogeneous by visual inspection and the exit temperature was measured with a hand held insertion probe thermocouple at 139° C. (283° F.). The maximum allowable temperature for this adhesive is 141° C. (285° F.). Total throughput in this example was 340.1 kg/hr (750 lbs/hr) or a throughput of about 27.2 kg/hr/l free volume of the continuous compounding device. Advantageously, this relatively high throughput achieved a good mix and acceptable exit melt temperatures. It is believed that the substantially homogeneous mixing of the adhesive composition coupled with the lower exit temperature was due to the material addition sequence of a single elastomer feed with elastomer-compatible tackifier followed by addition of elastomer-compatible tackifier, elastomer, elastomer-compatible tackifier and adjutants.

In Comparative Example A, a suitable pressure sensitive adhesive composition was formed at a conventional throughput rate of about 5.4 kg/hr/l free volume. In Comparative Example B, the same process from Comparative Example A was followed, but the throughput was increased to 12.7 kg/hr/l free volume. This resulted in an unacceptable increase in the processing temperature. In Comparative Example C, the same process was followed as in Comparative Example A, except that an additional elastomer-compatible tackifier feed port at section 1 was added so that the process included four tackifier feed sections rather than three tackifier feed sections as in Comparative Example A. As with Comparative Example B, this also resulted in an unacceptable increase in the processing temperature. Although the resulting compositions in Comparative Examples B and C were substantially homogeneous, a tape including these compositions did not exhibit pressure sensitive properties because of the unacceptable increases in the processing temperature.

In Example 1, a sequential order of addition of the elastomer-compatible tackifier incrementally modified the viscosity while the processing temperature remained suitably low. A tape that included the resulting homogeneous composition from Example 1 exhibited pressure sensitive properties, i.e., having a slow rate peel resistance.

The complete disclosures of all patents, patent applications, and publications are herein incorporated by reference as if individually incorporated. Various modifications and alterations of this invention will become apparent to those skilled in the art from the foregoing description without departing from the scope and the spirit of this invention, and it should be understood that this invention is not to be unduly limited to the illustrative embodiments set forth herein.

What is claimed is:

1. A continuous solventless hot melt process for preparing a pressure sensitive adhesive composition comprising:

(a) providing a first elastomer to a first section of a continuous compounding device;

(b) masticating the first elastomer for a time sufficient to produce a masticated first elastomer having a melt viscosity less than the melt viscosity of the first elastomer prior to masticating;

(c) adding a first tackifier that is compatible with the first elastomer to form a mixture comprising the first elastomer and first tackifier;

(d) adding a second elastomer to the mixture comprising the first elastomer and first tackifier in a subsequent section of the continuous compounding device, wherein the second elastomer is a different elastomer than the first elastomer;

(e) masticating and mixing the second elastomer with the mixture comprising the first elastomer and the first tackifier to form a mixture comprising two different elastomers and a tackifier;

(f) adding a second tackifier to the mixture comprising two different elastomers and a tackifier, wherein the second tackifier is the same or a different tackifier than the first tackifier; and (g) forming an adhesive composition.

2. The process of claim 1 wherein the first and the second elastomer each comprise a non-thermoplastic hydrocarbon elastomer.

3. The process of claim 2 wherein the first tackifier added in (c) is in an amount rang from about 5 wt. % to about 25 wt. % of a total amount of the first tackifier.

4. The process of claim 2 wherein the first elastomer comprises greater than about 50 wt % up to about 100 wt. %, but not including 100 wt. %, of a total amount of the elastomer.

5. The process of claim 1 wherein adding the first tackifier comprises adding the first tackifier in two or more portions prior to adding the second elastomer.

6. The process of claim 1 wherein the throughput is about 10.0 kg/hr/l free volume or more of the continuous compounding device and the adhesive composition is formed at a processing temperature of about 120° C. to about 160° C.

7. The process of claim 1 wherein the first tackifier is added before or after masticating the first elastomer.

8. The process of claim 1 wherein the first elastomer and the first tackifier are added to a first conveying section.

9. The process of claim 1 wherein the second tackifier is compatible with the second elastomer.

10. The process of claim 1 wherein the first and second tackifiers are different.

11. A continuous process for preparing an adhesive composition comprising:
 (a) providing a continuous compounding device having a twin screw therein, which has a sequence of conveying and processing sections that alternate with one another;
 (b) masticating and mixing a first elastomer and a first tackifier that is compatible with the first elastomer in a first processing section for a time sufficient to produce a masticated mixture having a melt viscosity less than the melt viscosity of the first elastomer prior to masticating and mixing;
 (c) conveying the masticated mike to a subsequent processing section and adding a second elastomer that is incompatible with the first elastomer;
 (d) masticating and mixing the second elastomer with the masticated mixture of the first elastomer and the first tackifier in the subsequent processing section to form a mixture of incompatible elastomers and first tackifier;
 (e) adding a second tackifier to the mixture of incompatible elastomers and first tackifier, wherein the second tackifier is compatible with the second elastomer; and
 (f) forming an adhesive composition.

12. The process of claim 11 wherein the first elastomer comprises an aliphatic elastomer and the second elastomer comprises an aromatic elastomer.

13. The process of claim 11 further comprising injecting an oxygen-containing gas into at least one section of the continuous compounding device utilized in the process.

14. The process of claim 11 wherein the throughput is about 10. kg/hr/l free volume or more of the continuous compounding device the adhesive composition is formed at a processing temperature of about 120° C. to about 160° C.

15. The process of claim 11 wherein adding the first tackifier comprises adding the first tackifier in two or more portions prior to adding the second elastomer.

16. A continuous process for preparing an adhesive article comprising:
 (i) providing a continuous process for preparing an adhesive composition comprising;
  (a) masticating and mixing a first elastomer and a first tackifier that is compatible with the first elastomer in a first processing section for a time sufficient to produce a masticated mixture having a melt viscosity less than the melt viscosity of the first elastomer prior to masticating and mixing;
  (b) conveying the masticated mixture to a subsequent processing section and adding a second elastomer that is different from the first elastomer;
  (c) masticating and mixing the second elastomer with the masticated mixture of the first elastomer and the first tackier to form a mixture of first and second elastomers and first tackifier;
  (d) adding a second tackifier to the mixture of first and second elastomers and first tackifier, wherein the second tackifier is the same or different than the first tackifier; and
  (e) forming an adhesive composition; and
 (ii) depositing the adhesive composition on a web to form an adhesive article.

17. The process of claim 16 wherein adding the first tackifier comprises adding the first tackifier in two or more portions prior to adding the second elastomer.

18. The process of claim 17, wherein the web comprises a material including a polymeric film, a metallic foil, paper, cloth, a plastic/cloth combination, a ceramic film, or a combination thereof.

* * * * *

UNITED STATES PATENT AND TRADEMARK OFFICE
CERTIFICATE OF CORRECTION

PATENT NO. : 6,166,110
DATED : November 24, 1998
INVENTOR(S) : Timothy D. Bredahl et al.

It is certified that error appears in the above-identified patent and that said Letters Patent is hereby corrected as shown below:

Title page,
Item [57], ABSTRACT,
Line 7, after "in the" insert -- process --;

Column 5,
Line 21, "means" should read -- mean --;

Column 9,
Line 20, "then transported" should read -- then be transported --;

Column 10,
Line 41, "at a controlled rates" should read -- at a controlled rate --;

Column 13,
Lines 18 and 20, "usefull" should read -- useful --;

Column 16,
Line 33, "section I" should read -- section 1 --;
Line 34, "section 2." should read -- section 2, --;

Column 18,
Line 32, "(3 5.9 lbs/hr)" should read -- (35.9 lbs/hr) --;
Line 67, "piece," should read -- pieces, --;

Column 20,
Line 47, "range" should read -- ranging --;

Column 21,
Line 12, "mike" should read -- mixture --;
Line 31, "10.kg/hr/1" should read -- 10.0 kg/hr/1 --;

UNITED STATES PATENT AND TRADEMARK OFFICE
CERTIFICATE OF CORRECTION

PATENT NO. : 6,166,110
DATED : November 24, 1998
INVENTOR(S) : Timothy D. Bredahl et al.

It is certified that error appears in the above-identified patent and that said Letters Patent is hereby corrected as shown below:

<u>Column 22,</u>
Line 18, "tackier" should read -- tackifier --

Signed and Sealed this

Seventeenth Day of May, 2005

JON W. DUDAS
*Director of the United States Patent and Trademark Office*